United States Patent [19]
Bucourt et al.

[11] 3,720,713
[45] March 13, 1973

[54] NOVEL PROCESS FOR PREPARATION OF OPTICALLY ACTIVE KETO STEROIDS

[75] Inventors: Robert Bucourt; Lucien Nedelec, both of Clichy-sous-Bois; Jean-Claude Gasc, Bondy, all of France

[73] Assignee: Rouseel Uclaf, Paris, France

[22] Filed: March 21, 1969

[21] Appl. No.: 809,382

Related U.S. Application Data

[62] Division of Ser. No. 633,430, April 25, 1967, Pat. No. 3,472,885.

[52] U.S. Cl. ............................................. 260/559 H
[51] Int. Cl. ............................................. C07c 103/19
[58] Field of Search ................................. 260/559 H

[56] References Cited

UNITED STATES PATENTS 3,555,088   1/1971   Howard et al. ................... 260/559 H

*Primary Examiner*—Howard T. Mars
*Assistant Examiner*—Gerald A. Schwartz
*Attorney*—Hammond & Littell

[57] ABSTRACT

Intermediates in the synthesis of steroids having the formulas

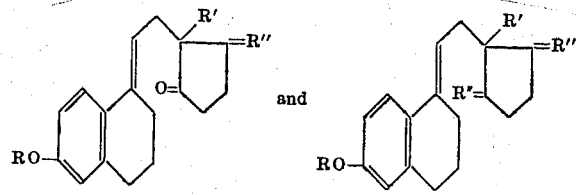

wherein R and R' are alkyl of one to three carbon atoms and may be different and R'' is selected from the group consisting of a hydrazide, a semicarbazide, a semioxamazide, a lower alkanediol, a lower alkanedithiol and a lower alkoxycarbonyl hydrazine.

3 Claims, No Drawings

NOVEL PROCESS FOR PREPARATION OF OPTICALLY ACTIVE KETO STEROIDS

PRIOR APPLICATIONS

The present application is a divisional application of copending, commonly assigned U.S. Pat. application Ser. No. 633,430, filed Apr. 25, 1967, now U.S. Pat. No. 3,472,885.

THE PRIOR ART

The importance of the role of optically active compounds in chemistry and particularly in chemotherapy is well known and the pharmachological activity of compounds is generally a direct function of their configuration. Nature is known to supply organic compounds with asymmetric carbon atoms in their optically active form, but chemical synthesis leads to racemic mixtures of compounds with asymmetric carbon atoms which are products inactive on polarized light. New processes are known for obtaining products by asymmetric synthesis based on the phenomena of induction but until recently these were only scientific curiosities being applicable only in rare and isolated cases and producing only moderate optically active yields.

Therefore, it has been necessary to resort to resolution of racemic products to obtain the optically active compounds but his results in loss of half the starting product in a definite manner. In those cases where the recovery of the undesirable or inactive isomer is possible, it nearly always involves a laborious and therefore onerous operation. Moreover, resolution frequently causes still other inconveniences, and, for certain classes of compounds, it is particularly difficult to realize.

This is the case especially with regard to the resolution of ketonic products, about which an American author, (W. R. Adams, J. A. C. S., 1966, 88, 162) has recently stated:

"The resolution of racemic ketones or aldehydes, although of frequent interest in the study of reactional mechanisms and in synthesis, continues to be a difficult problem." (See apropos to this also, E. L. Eliel, Stereochemistry of Carbon Compounds, edited by McGraw-Hill Book Company, in 1962, page 56 and following.)

Moreover, Japanese research workers, (T. Miki et al., Chemical and Pharmaceutical Bulletin of Japan. Vol. 13, page 1185, 1965), in a synthesis of steroids utilizing as an intermediate 3-methoxy-13-methyl-$\Delta^{1,3,5(10),8,14}$-gonapentaene-17-one, have effected resolution at only two more remote stages, which is not very economical, and they have obtained only moderate yields.

OBJECTS OF THE INVENTION

It is an object of the invention to provide a novel process for the preparation of optically active ketonic steroids from inactive racemic mixtures in yields of more than 50 percent.

It is another object of the invention to provide novel intermediates for the synthesis of 13β-gonapentaenes.

These and other objects and advantages of the invention will become obvious from the following detailed description.

THE INVENTION

The process of the invention for the preparation of 13β-R'-gonapentaenes of the formula

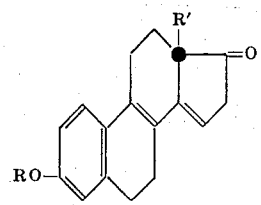

wherein R and R' can be the same or different and are alkyl of one to three carbon atoms comprising condensing a symdiketone of the formula

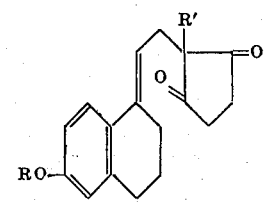

wherein R and R' have the above definition in an organic medium with an optically active isomer of a ketone reactant selected from the group consisting of a hydrazide, a semicarbazide, a semioxamazide, a diol, a dithiol and a lower alkoxycarbonyl hydrazine to obtain a mixture in equilibrium of a 3-OR-8(14)-seco-13β-R'-17-R''-$\Delta^{1,3,5(10),9(11)}$-gonatetraene-14-one of the formula

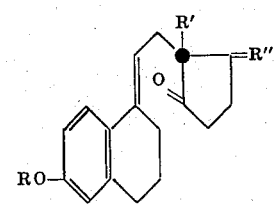

a 3-OR-8(14)-seco-13α-R'-17-R''-$\Delta^{1,3,5(10),9(11)}$-gonatetraene-14-one of the formula

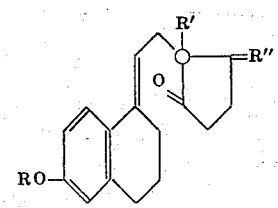

and possibly 3-OR-8(14)-seco-13-R'-14,17-di-R''-$\Delta^{1,3,5(10),9(11)}$-gonatetraene of the formula

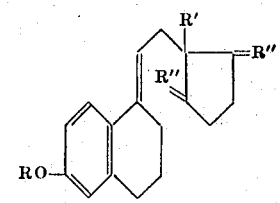

wherein R and R' have the above definitions and R'' is the radical of the ketone reactant, isolating the said 3-OR-8(14)-seco-13β-R'-17-R''-$\Delta^{1,3,5(10),9(11)}$-gonatetraene-14-one, subjecting the 3-OR-8(14)-seco-13α-R'-17-R''-$\Delta^{1,3,4(10),9(11)}$-gonatetraene-14-one and any 3-OR-8(14)-seco-13R'-14,17-di-R''-$\Delta^{1,3,5(10),9(11)}$-gonatetraene to the action of a strong mineral acid or a functional exchange agent in the presence of water to obtain the starting sym-diketone which is recycled to the beginning of the process, cyclizing the 3-OR-8(14)-seco-13β-R'-17-R''-Δ$^{1,3,5(10),9(11)}$-gonatetraene-14-one with a strong mineral acid in an anhydrous organic solvent to obtain the corresponding 3-OR-13β-R'-17-R''-Δ$^{1,3,5(10),8,14b}$-gonapentaene and subjecting the latter to acid hydrolysis or the action of a functional exchange agent to form the corresponding 3-OR-13β-R'-Δ$^{1,3,5(10),8,14b}$-gonapentaene-17-one.

In the process of the invention, the condensation of the starting dione with the ketone reactant results in the formation of two diastereo-isomers, namely, the diasterioisomer of the desired 13β-configuration and that of reverse configuration at the 13-carbon atom and sometimes, generally in a very limited quantity, the product of dicondensation at the two ketone functions is formed. A considerable advantage of the present process lies in the fact that it allows the recovery of the 13α-R diastereoisomer and if present, the product of dicondensation by converting these products into the starting dione.

The said conversion may be effected with the products in pure condition or with the mixtures which are found in the residue of purification of the 13β-diastereoisomer. This conversion is effected by splitting the ketonic protective groups of these products by the usual methods, such as acid hydrolysis or functional exchange to obtain the starting dione, which is then subjected to a new cycle of treatments as defined above. This results in the possibility of converting the starting dione into an optically active product with yields higher than 50 percent which also distinguishes the present invention from the conventional processes of resolution.

A further considerable advantage of the process of the invention consists in that by modifying the existing equilibrium between the diverse compounds of the reaction mixture, it allows, even in this medium, the recovery of the inactive 13α-diastereoisomer and of the dicondensation product if formed, and thus to result in the exclusive formation of the 3-OR-8(14)-seco-13β-R'-17-R''-Δ$^{1,3,5(10),9(11)}$-gonatetraene-14-one. To attain this, the condensation reaction of the sym-diketone with the ketone reactant is realized in a system of solvents chosen so that the condensation product with the 13β-configuration is the least soluble of the compounds present. The removal of the said product from the reaction medium then brings about a spontaneous and continuous shifting of the reaction towards its single production.

This additional advantage is particularly well illustrated when applying the process of the invention to the condensation of 3-methoxy-8(14)-seco-13-methyl-Δ$^{1,3,5(10),9(11)}$-gonatetraene-14,17-dione with (2R:3R)tartramic hydrazide in aqueous methanol in the presence of acetic acid. Since the 17-([2R:3R]-tartramylhydrazone) of 3-methoxy-8(14)-seco-13β-methyl-Δ$^{1,3,5(10),9(11)}$-gonatetraene-14,17-dione is the least soluble of the compounds present in this medium, it separates easily from the reaction medium so that the equilibrium between the compounds present is finally found shifted towards the sole production of the desired 13β-compound.

Examples of suitable ketone reactants are (+)(R)-5-(α-phenyl-ethyl)-semioxamazide, (1R : 3 R : 4S)-menthoxy carbonyl hydrazine, tartramic hydrazide (2R : 3 R), 2,3-propanediol, etc.

The organic solvent medium in which the condensation of sym-diketone is effected may be a lower aliphatic alcohol such as methanol, ethanol, propanol, etc.; ethers such as lower alkyl ethers, i.e., ethyl ether, cyclic ethers such as dioxane, etc.; and chlorinated hydrocarbons such as methylene chloride, etc.

Examples of the strong mineral acid for the cyclization and acid hydrolysis are hydrochloric acid, hydrobromic acid, sulfuric acid, etc., and examples of functional exchange agents are pyruvic acid glyoxalic acid, etc.

The invention finds its application especially in the preparation of optically active starting materials for pharmaceutic products, such as hypocholesterolemiants, anti-conceptionals and estrogens. A particularly interesting and illustrative application of the process of the invention is the preparation of 3-methoxy-13β-methyl-Δ$^{1,3,5(10),8,14}$-gonapentaene-17-one starting from the naturally inactive 3-methoxy-8(14)-seco-13-methyl-Δ$^{1,3,5(10),9(11)}$-gonatetraene-14,17-dione.

In the following examples there are described several preferred embodiments to illustrate the invention. However, it should be understood that the invention is not to be limited to the specific embodiments.

EXAMPLE I

PREPARATION OF (−) 3-methoxy-13β-methyl-Δ$^{1,3,5(10),8,14b}$-gonapentaene-17-one Step A : Condensation with (+) (R)-5-(α-phenylethyl)-semi-oxamazide and separation of diastereoisomers 500 mg of 3-methoxy 13-methyl-8,14-seco-Δ$^{1,3,5(10),9(11)}$-gonatetraene-14,17-dione having a melting point of 80°C, described by Windholz et al., J. Org. Chem., Vol. 28, 1963, p. 1093, were introduced into 5 cc of methanol to which was added 380 mg of (+)(R)-5-(α-phenylethyl)-semioxamazide having a melting point of 167°C and a specific rotation of $[\alpha]_D^{20} = +102°$ (c = 1.1 percent in chloroform) described by Leonard et al, J. Org. Chem., Vol. 15, 1950, p. 42–43. The resulting reaction mixture was agitated for about 120 hours at room temperature under a nitrogen atmosphere and then the mixture was evaporated to dryness under reduced pressure. The residue obtained was subjected to chromatography through silica gel with elution with a benzene-ethyl acetate mixture (7:3).

The first fraction recovered was 80 mg of the starting dione and the second fraction (100 mg) was a mixture of the same dione and of the (−) 17-[(R)-5'-(α-phenylethyl)-semioxamazone] of 3-methoxy-8(14)-seco-13α-methyl-Δ$^{1,3,5(10),9(11)}$-gonatetraene-14,17-dione.

The third fraction consisted of 122 mg of (−) 17-[(R)-5'-(α-phenylethyl)-semioxamazone] of 3-methoxy-8(14)-seco-13α-methyl-Δ$^{1,3,5(10),9(11)}$-gonatetraene-14,17-dione.

The content of nitrogen in the latter amorphous product was 8.4 gm %/gm (theory: 8.62 gm %/gm).

Ultra-Violet Spectra (in ethanol):

| | |
|---|---|
| max. to 208 mμ | = 30,700 |
| max. to 263 mμ | = 24,700 |
| inflection toward 298 mμ | = 6,350 |

Infra-Red Spectra (in chloroform):
max. to 3,400 cm⁻¹ and 3,340 cm⁻¹ (band from

max. to 1,750 cm⁻¹, 1,715 cm⁻¹, 1,680 cm⁻¹ (band from

Circular dichroism (in dioxane):
$\Delta_\epsilon$  300 m$\mu$ = −10.07
$\Delta_\epsilon$  275 m$\mu$ = −24.6
$\Delta_\epsilon$  247 m$\mu$ = +22.94
$\Delta_\epsilon$  220 m$\mu$ = +9.60

A fourth fraction consisted of 236 mg of the (+) 17-[(R)-5'-($\alpha$-phenylethyl)-semioxamazone] of 3-methoxy-8(14)-seco-13$\beta$-methyl-$\Delta^{1,3,5(10),9(11)}$-gonatetraene-14,17-dione having a melting point of 174°C and a specific rotation of $[\alpha]_D^{20} = +269°$ ($c = 0.4$ percent in dimethylformamide). A sample of the said product, recrystallized for the analysis, (melting point and specific rotation of $[\alpha]_D^{20}$ remaining unchanged,) had the following characteristics:
Analysis: $C_{29}H_{33}O_4N_3$; molecular weight = 487.58
Calculated: C 71.43%; H 6.83%; N 8.61%
Found: C 71.4; H 7.0; N 8.8
Ultra-Violet Spectra (in ethanol):

| | |
|---|---|
| Max. to 261–262 m$\mu$ | = 27,000 |
| Infl. toward 297 m$\mu$ | = 7,250 |

Infra-Red Spectra (in chloroform):
Identical to that of the 13$\alpha$-diastereoisomer.
Circular dichroism (in dioxane):
$\Delta_\epsilon$  295 m$\mu$ = +13.064
$\Delta_\epsilon$  275 m$\mu$ = +27.14
$\Delta_\epsilon$  253 m$\mu$ = −17.39
$\Delta_\epsilon$  228 m$\mu$ = +11.04
$\Delta_\epsilon$  223 m$\mu$ = +9.11
$\Delta_\epsilon$  207 m$\mu$ = −12.88

A fifth fraction consisted of 153 mg of the 14,17-di-[(R)-5'-($\alpha$-phenylethyl)-semioxamazone] of 3-methoxy-8(14)-seco-13-methyl-$\Delta^{1,3,5(10),9(11)}$-gonatetraene-14,17-dione having a melting point of about 140°C.
Ultra-Violet Spectra (in ethanol):

| | |
|---|---|
| Max. to 206 m$\mu$ | = 47,100 |
| Max. to 263 m$\mu$ | = 37,700 |

Infra-Red Spectra (in chloroform):
Strong bands due to

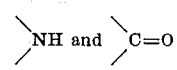

The (−) 17-[(R)-5'-($\alpha$-phenylethyl)-semioxamazone] of 3-methoxy-8(14)-seco-13$\alpha$-methyl-$\Delta^{1,3,5(10),9(11)}$-gonatetraene-14,17-dione, the corresponding dextrorotatory diastereoisomer of 13$\beta$-methyl configuration and the 14,17-di-[R-5'-($\alpha$-phenyl-ethyl)-semioxamazone] of 3-methoxy-8(14)-seco-13-methyl-$\Delta^{1,3,5(10),9(11)}$-gonatetraene-14,17 dione are not described in the literature.

Step B: Cyclization and hydrolysis of the diastereoisomer of 13$\beta$-methyl configuration a. Cyclization 500 mg of (+) 17-[(R)-5'-($\alpha$-phenylethyl)semioxamazone] of 3-methoxy-8(14)-seco-13$\beta$-methyl-$\Delta^{1,3,5(10),9(11)}$-gonatetraene-14,17-dione with a melting point of 174°C and a specific rotation of $[\alpha]_D^{20} = +269°$ ($c=4$ percent in dimethylformamide) prepared in Step A, where introduced into 5 cc of a solution of anhydrous 1.5 N hydrobromic acid in dioxane at a temperature of +15°C and under an atmosphere of nitrogen. The reaction mixture was agitated for 20 minutes at about +15°C and then 15 cc of water were slowly added thereto. The precipitate formed was vacuum filtered, washed first with water, then with an aqueous solution of sodium bicarbonate and again with water until the wash waters were neutral. The precipitate was isolated by vacuum filtering and dried under vacuum, to obtain 480 mg of raw 17-[(R)-5'-($\alpha$-phenyl-ethyl)-semioxamazone] of 3-methoxy-13$\beta$-methyl-$\Delta^{1,3,5(10),8,14}$-gonapentaene-17-one which product was utilized as such for the next step.

b. Hydrolysis

The product obtained in (a) was admixed with 2.3 cc of water and 7.2 cc of pyruvic acid and after the mixture was agitated for one hour at room temperature, it was neutralized with an aqueous solution of sodium bicarbonate. The precipitate formed was first vacuum filtered, then washed with water until neutral and dried under vacuum, to obtain a solid which, after dissolution in methylene chloride, was purified by being passed through a column of magnesium silicate. After a last purification by crystallization in isopropyl ether, 90 mg of (−)3-methoxy-13$\beta$-methyl-$\Delta^{1,3,5(10),8,14}$-gonapentaene-17-one, having a melting point of 143°C and a specific rotation of $[\alpha]_D^{20} = -100°$ ($c = 0.7$ percent in chloroform) were recovered. After a second crystallization in isopropyl ether, the product had a melting point of 143°C (unchanged), and a specific rotation of $[\alpha]_D^{20} = -103°$ ($c = 0.7$ percent in chloroform).
Analysis: $C_{19}H_{20}O_2$; molecular weight = 280.36
Calculated: C 81.39%; H 7.19%
Found: C 81.4; H 7.4
Ultra-Violet Spectra (in ethanol):

| | |
|---|---|
| Inflection toward 221 m$\mu$ | = 11,650 |
| Max. to 228 – 229 m$\mu$ | = 12,700 |
| Max. to 235 m$\mu$ | = 13,350 |
| Inflection toward 241 m$\mu$ | = 10,200 |
| Inflection toward 302–303 m$\mu$ | = 24,300 |
| Max. to 313 m$\mu$ | = 29,100 |
| Inflection toward 324 m$\mu$ | = 22,900 |

Circular dichroism (in dioxane)
$\Delta_\epsilon$  325 m$\mu$ = −2.21
$\Delta_\epsilon$  293 m$\mu$ = +2.89
$\Delta_\epsilon$  233 m$\mu$ = −9.6
$\Delta_\epsilon$  226 m$\mu$ = −9.72

(−) 3-methoxy-13$\beta$-methyl-$\Delta^{1,3,5(10),8,14}$-gonapentaene-17-one is not described in the literature.

Step C: Recovery of the initial dione starting from the diastereoisomer of 13$\alpha$-methyl configuration 100 mg of the (−) 17-[(R)-5'-($\alpha$-phenylethyl)semioxamazone] of 3-methoxy-8(14)-seco-13$\alpha$-methyl-$\Delta^{1,3,5(10),9(11)}$-gonatetraene-14,17-dione were introduced into 4 cc of acetone and then 0.5 cc of water and about 0.2 cc of pyruvic acid were added to obtain a pH-value of 1.5. The reaction mixture was agitated over a period of 24 hours at room temperature, after which the reaction mixture was poured into water and extracted with ether. The extract was washed first with water, then with a saturated solution of sodium bicarbonate, and again with water, then dried and evaporated to dryness under vacuum to obtain 64 mg of crystallized residue which consisted of 3-methoxy-8(14)-seco-13-methyl-$\Delta^{1,3,5(10),9(11)}$-gonatetraene-14,17-dione, a product inactive by nature, which was then purified, (yield of purification = about 87 percent). The product obtained was identical to the starting product in every respect. In an analogous manner, the initial dione was recovered by starting with 14,17-di-[(R)-5'-($\alpha$-phenyl-ethyl) semi-oxamazone] of 3-methoxy-8(14)-seco-13-methyl-$\Delta^{1,3,5(10),9(11)}$-14,17-dione, having a melting point of 140°C.

EXAMPLE II

PREPARATION OF (−) 3-methoxy-13$\beta$-methyl-$\Delta^{1,3,5(10),8,14b}$-gonapentaene-17-one Step A: Condensation with (1R:3R:4S)-menthoxycarbonyl hydrazine and separation of the diastereoisomer of 13$\beta$-methyl configuration 2.5 gm of 3-methoxy-8-(14)-seco-13-methyl-$\Delta^{1,3,5(10),9(11)}$-gonatetraene-14,17-dione having a melting point of 80°C followed by 1.875 gm of (1R:3R:4S)-menthoxy carbonyl hydrazine having a melting point of 98°C and a specific rotation of $[\alpha]_D^{20}=-81.8°$ ($c = 1.1$ percent in chloroform) described by R. WOODWARD, (J.A.C.S., Vol. 63, 1941, p. 120) were introduced into 15 cc of chloroform. Then two drops of acetic acid were added thereto and the solution was agitated over a period of 20 hours at room temperature after which the reaction solution was reduced to dryness under reduced pressure. The residue obtained was subjected to chromatography through silica gel with elution with chloroform containing 5 percent of ethyl acetate.

After the elimination of a first fraction which consisted of 3-methoxy-8(14)-seco-13-methyl-$\Delta^{1,3,5(10),9(11)}$-gonatetraene-14,17-dione, a second fraction of 1.5 gm consisting of a mixture of the 17-[(1R:3R:4S)-menthoxy carbonyl hydrazone] of 3-methoxy-8(14)-seco-13$\alpha$-methyl-$\Delta^{1,3,5(10),9(11)}$-gonatetraene-14,17-dione and of the corresponding 13$\beta$-methyl diastereoisomer was isolated. The diastereoisomer of the 13$\beta$-methyl configuration was separated from the mixture by crystallization from ethanol, followed by repeated recrystallizations from methanol to obtain 300 mg of the (+) 17-[(1R:3R:4S)-menthoxy carbonyl hydrazone] of 3-methoxy-8(14)-seco-13$\beta$-methyl-$\Delta^{1,3,5(10),9(11)}$-gonatetraene-14,17-dione having a melting point of 175°–176°C and a specific rotation of $[\alpha]_D^{20} = +148°$ ($c = 0.75$ percent in chloroform).

Analysis: $C_{30}H_{42}O_4N_2$; molecular weight = 494.65
Calculated: C 72.84%; H 8.55%; N 5.66%
Found: C 72.8; H 8.4; N 5.6

Ultra-Violet Spectra (in ethanol):

| | |
|---|---|
| max. to 265 – 266 m$\mu$ | = 19,500 |
| inflection toward 298 m$\mu$ | = 4,500 |

Infra-Red Spectra (in chloroform):

| | |
|---|---|
| Absorption to 3,400 cm$^{-1}$ | (Band of >NH) |
| 1,740 and 1,700 cm$^{-1}$ | (Band of >C=O) |

Circular dichroism (in 65% methanol, 20% chloroform, 10% water and 5% acetic acid)

$\Delta_\epsilon$ 300 m$\mu$ = +5.81
$\Delta_\epsilon$ 263 m$\mu$ = +24
$\Delta_\epsilon$ 238 m$\mu$ = −18.4

The dry extract of the mother liquors of the diverse recrystallizations consisted of a mixture of the two 13$\alpha$-methyl and 13$\beta$-methyl hydrazone diastereoisomers and being especially rich in the 13$\alpha$-methyl isomer.

A third fraction was recovered consisting of the (−) 14,17-di-[(1R:3R:4S)-menthoxy carbonyl hydrazone] of 3-methoxy-8(14)-seco-13-methyl-$\Delta^{1,3,5(10),9(11)}$-gonatetraene-14,17-dione which was purified by recrystallization from an isopropanol-chloroform mixture to obtain the pure dihydrazone with a melting point of about 190°C and a specific rotation of $[\alpha]_D^{20}=-31.8°$ ($c = 0.75$ percent in chloroform). The nitrogen content of this compound was 8.3 gm %/gm (theory = 8.11 gm %/gm).

Ultra-Violet Spectra (in ethanol):

| | |
|---|---|
| Max. to 264 m$\mu$ | = 20,200 |
| Inflection to 295 m$\mu$ | = 3,940 |

Infra-Red Spectra (in chloroform):

| | |
|---|---|
| Absorption to 3,400 cm$^{-1}$ | :(band of >NH) |
| 1,740 and 1,700 cm$^{-1}$ | :(band of >C=O) |
| Max. to 1,500 cm$^{-1}$(strong): | (aromatic band) |

The isolated compounds, namely the (+) 17-[(1R:3R:4S)-menthoxy carbonyl hydrazone] of 3-methoxy-8(14)-seco-13$\beta$-methyl-$\Delta^{1,3,5(10),9(11)}$-gonatetraene-14,17-dione and the corresponding isomer of 13$\alpha$-methyl configuration and the (−)14,17-di-[menthoxy carbonyl hydrazone] of 3-methoxy-8(14)-seco-13-methyl-$\Delta^{1,3,5(10),9(11)}$-gonatetraene-14,17-dione are not described in the literature.

Step B: Cyclization and hydrolysis of the diastereoisomer of 13$\beta$-methyl configuration 280 mg of the (+) 17-[(1R:3R:4S)-menthoxy carbonyl hydrazone] of 3-methoxy-8(14)-seco-13$\beta$-methyl-$\Delta^{1,3,5(10),9(11)}$-gonatetraene-14,17-dione having a melting point of 175°–176°C and a specific rotation of $[\alpha]_D^{20} = +148°$ ($c = 0.75$ percent in chloroform), were introduced into 3.2 cc of dioxane under agitation and in the total absence of moisture. The suspension obtained was cooled to about +12°C and then 1 cc of a 6.9 N-solution of hydrobromic acid in dioxane was added to the suspension which was then agitated for 20 minute and diluted with 1.6 cc of water. A precipitate was formed and was dissolved in 1.6 cc of acetone and the solution was agitated 2 hours at room temperature and then diluted with water and agitated for further 30 minutes. The precipitate formed was vacuum filtered, washed with water and dried to obtain 240 mg of a product which was purified by chromatography through silica gel with elution with a benzene-ethyl acetate (9:1) mixture. The solid substance obtained was crystallized from isopropyl ether to obtain 88 mg of (−) 3-methoxy-13β-methyl-$\Delta^{1,3,5(10),8,14}$-gonapentaene-17-one having a melting point of 143°C and a specific rotation of $[\alpha]_D^{20} = -103°$ ($c = 0.7$ percent in chloroform). This product was identical to that described in the preceding example.

Step C: Recovery of the initial dione starting from the mixture of diastereoisomers of 13α-methyl and 13β-methyl configuration 100 mg of the mixture obtained in Step A, consisting of (+) 17-[(1R:3R:4S)-menthoxy carbonyl hydrazone] of 3-methoxy-8 (14)-seco-13β-methyl-$\Delta^{1,3,5(10),9(11)}$-gonatetraene-14,17-dione and the corresponding 13α-methyl isomer were introduced into 5 cc of acetone. Then 0.5 cc of water and about 0.2 cc of pyruvic acid were added to obtain a pH value of 1.5. The reaction mixture was agitated for a period of 24 hours, after which it was poured into water and extracted with ether. The extract obtained was washed first with water, then with a solution of sodium bicarbonate and again with water, then dried and evaporated to dryness under vacuum, to obtain the starting dione, namely 3-methoxy-8(14)-seco-13-methyl-$\Delta^{1,3,5(10),9(11)}$-gonatetraene-14,17-dione. In analogous manner, the initial dione was obtained from the (−) 14,17-di-[(1R:3R:4S)-menthoxy carbonyl hydrazone] of 3-methoxy-8(14)-seco-13-methyl-$\Delta^{1,3,5(10),9(11)}$-gonatetraene-14,17-dione having a melting point of 190°C and a specific rotation of $[\alpha]_D^{20} = -31.8°$ (in chloroform).

EXAMPLE III

PREPARATION OF (−) 3-methoxy-13β-methyl-$\Delta^{1,3,5(10),8,14b}$-gonapentaene-17-one Step A: Condensation with (2R:3R) tartramic hydrazide and separation of the diastereoisomer of 13β-methyl configuration 165.6 gm of 3-methoxy-8(14)-seco-13-methyl-$\Delta^{1,3,5(10),9(11)}$-gonatetraene-14,17-dione having a melting point of 80°C, 104.4 gm of (2R:3R) tartramic hydrazide having a melting point of (tube) first 152°C, then of 200°C with a specific rotation of $[\alpha]_D^{20} = +124°$ ($c = 1$ percent in water), [described by Nerdel et al, Berichte, Vol. 85, pages 1138–1144, (1952)], 50.4 cc of acetic acid and 168 cc of water were introduced into 840 cc of methanol with agitation. The suspension was agitated over a period of 72 hours at room temperature and under an atmosphere of nitrogen and the crystallized precipitate obtained was vacuum filtered, washed first with a methanol-water (5:1) mixture, then with water and dried to obtain 207 gm of product. The said product was sifted and then agitated in 1,500 cc of methanol at reflux. After the addition of 200 cc of water, the reaction mixture was cooled to 0°C and vacuum filtered. The precipitate was washed with a methanol-water (7:1) mixture and dried to obtain 185 gm of the (+) 17-[(2R:3R)-tartramylhydrazone] of 3-methoxy-8(14)-seco-13β-methyl-$\Delta^{1,3,5(10),9(11)}$-gonatetraene-14,17-dione which corresponded to a yield of 75.5 percent based on the starting dione. The said product had a melting point of 192° C and a specific rotation of $[\alpha]_D^{20} = +234°$ ($c = 1$ percent in pyridine) and of $[\alpha]_D^{20} = +264°$ ($c = 0.2$ percent in methanol).

Analysis: $C_{23}H_{29}O_6N_3$; molecular weight = 443.48
Calculated: C 62.29%; H 6.59%; N 9.47%
Found: C 62.1; H 6.7; N 9.5
Ultra-Violet Spectra (methanol)

| | |
|---|---|
| Max. to 262 – 263 mμ | = 19,900 |
| Inflect. to 298 mμ | = 4,700 |

Circular Dichroism (in dioxane)
$\Delta\epsilon$  300 mμ = +5.92 (inflection)
$\Delta\epsilon$  267 mμ = +22.18
$\Delta\epsilon$  244 mμ = −19.62

The (+) 17[(2R:3R)-tartramylhydrazone] of 3-methoxy-8(14)-seco-13β-methyl-$\Delta^{1,3,5(10),9(11)}$-gonatetraene-14,17-dione is not described in the literature.

Step B: Cyclization and hydrolysis of the 13β-methyl diastereoisomer 30 gm of the (+) 17-[(2R:3R)-tartramylhydrazone] of 3-methoxy-8(14)-seco-13β-methyl-$\Delta^{1,3,5(10),9(11)}$-gonatetraene-14,17-dione having a melting point of 192°C, obtained in Step A, were introduced into 300 cc of a 1.5 N hydrobromic acid solution in anhydrous dioxane under agitation and an atmosphere of nitrogen. The reaction mixture, cooled to about +15°C, was agitated for 10 minutes, then 150 cc of water were added and after 20 minutes of agitation, another 900 cc of water were added thereto. Next, the reaction mixture was agitated for 30 minutes and then vacuum filtered. The precipitate was washed first with water, then with a solution of sodium bicarbonate, again with water, and dried to obtain 18.76 gm of a raw product which after dissolution in methylene chloride, was purified by filtration over a column of magnesium silicate. The methylene chloride solution obtained was dried under reduced pressure and the residue was crystallized from isopropyl ether to obtain 12.6 gm (67 percent yield based on dione) of (−) 3-methoxy-13β-methyl-$\Delta^{1,3,5(10),8,14}$-gonapentaene-17-one having a melting point of 143°C and a specific rotation of $[\alpha]_D^{20} = -103°$ ($c = 0.7$ percent in chloroform), identical to the product described in Examples I and II.

Various modifications of the process of the invention may be made without departing from the spirit or scope thereof and it is to be understood that the invention is to be limited only as defined in the appended claims.

We claim:

1. The 13β-R' and 13α-R' isomers of the formula

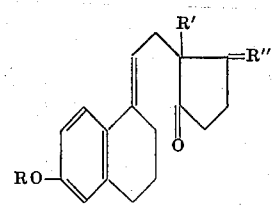

wherein R and R' may be different and are alkyl of one to three carbon atoms and R'' is tartramylhydrazone.

2. A compound of claim 1 wherein R and R' are methyl and R'' is (2R:3R)-tartramylhydrozone.

3. A compound of claim 1 which is 17-([2R:3R]-tartramylhydrazone) of 3-methoxy-8-(14)-Seco-13β-methyl-$\Delta^{1,3,5(10),9(11)}$-gonatetraene-14,17-dione.

* * * * *